United States Patent
Murthy et al.

(10) Patent No.: US 6,421,666 B1
(45) Date of Patent: Jul. 16, 2002

(54) MECHANISM FOR SHARING ANCILLARY DATA BETWEEN A FAMILY OF RELATED FUNCTIONS

(75) Inventors: Ravi Murthy, Foster City, CA (US); Jagannathan Srinivasan, Nashua, NH (US); Nipun Agarwal, Santa Clara, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/436,046

(22) Filed: Nov. 8, 1999

(51) Int. Cl.[7] .................................................. G06F 7/00
(52) U.S. Cl. ........................................................ 707/3
(58) Field of Search ............................... 707/1–4, 8, 10, 707/100–103 Z (56) References Cited

U.S. PATENT DOCUMENTS

| | | | | |
|---|---|---|---|---|
| 4,202,041 A | * | 5/1980 | Kaplow et al. | 364/900 |
| 4,692,858 A | * | 9/1987 | Redford et al. | 364/200 |
| 5,167,016 A | * | 11/1992 | Bagley et al. | 395/144 |
| 5,767,854 A | * | 6/1998 | Anwar | 345/355 |
| 5,809,212 A | * | 9/1998 | Shasha | 395/10 |
| 5,809,501 A | * | 9/1998 | Noven | 707/7 |
| 5,845,129 A | * | 12/1998 | Wendorf et al. | 395/726 |
| 5,942,741 A | * | 8/1999 | Longacre, Jr. et al. | 235/462.12 |
| 5,960,427 A | * | 9/1999 | Goel et al. | 707/4 |
| 6,061,678 A | * | 5/2000 | Klein et al. | 707/3 |
| 6,070,169 A | * | 5/2000 | Shorter | 707/103 |
| 6,154,742 A | * | 11/2000 | Herriot | 707/10 |
| 6,285,996 B1 | * | 9/2001 | Jou et al. | 707/4 |

* cited by examiner

Primary Examiner—John Breene
Assistant Examiner—Harold E. Dodds, Jr.
(74) Attorney, Agent, or Firm—Hickman Palermo Troung & Becker LLP; Marcel K. Bingham (57) ABSTRACT

A method and apparatus are provided for accessing ancillary data, and for generating and accessing ancillary data more efficiently. Ancillary data is generated during execution of the operator routine of a primary operator. The ancillary data is stored in a shared content and may be accessed through ancillary operators associated with the primary operator. Metadata is used to define a primary operator and ancillary operators associated with the primary operator. A DBMS, for example, receives a statement that includes a primary and at least one of its ancillary operators, and executes routines that implement the primary operator and the ancillary operator. During execution of the routine the implements the primary operator, ancillary data is generated and stored in shared content. During the execution of the routine that implements the ancillary operator, the ancillary data is retrieved from the shared content and is used. This mechanism enables efficient execution of a family of related functions over all the records in a dataset.

The sharing of context avoids redundant computation and enables use of ancillary data.

22 Claims, 4 Drawing Sheets

Call Sequence for Query SA

MECHANISM FOR SHARING ANCILLARY DATA BETWEEN A FAMILY OF RELATED FUNCTIONS

FIELD OF THE INVENTION

The present invention relates to mechanisms for executing functions in an executable statement.

BACKGROUND OF THE INVENTION

A family of functions is a set of functions applied to each record of a data set, such as the rows of a table or objects of an object collection. For example, the following family of functions $f1( ), \ldots, fn( )$ operate on the data set D, which contains records $r1, r2, \ldots, rm$.

$f1(r2, \ldots, p1, \ldots), \ldots, fn(r1, \ldots, p1, \ldots),$
$f1(r2, \ldots, p1, \ldots), \ldots, fn(r2, \ldots, p1, \ldots).$
$\ldots$
$f1(rm, \ldots, p1, \ldots), \ldots, fn(rm, \ldots, p1, \ldots)$ The functions operate on a record from the data set and may include one or more additional parameters. The functions within a family are related when the evaluation of one function may use data generated during the evaluation of another function. Data generated during the evaluation of a first function that may be used during the evaluation of a second function or routine is herein referred to as ancillary data. Data may be shared "horizontally", that is, between each evaluation of a function that operates on the same records, or "vertically", between each evaluation of the same function on different records, or both.

For example, the following query A contains a family of functions. Query A is written in SQL, a database language supported by many database servers. Query A follows.

SELECT Score(e.resume, 'Oracle')
FROM emp e
WHERE
   Contains(e.resume, 'Oracle')

Query A contains two operators, Contains and Score. An operator is a function that operates on one or more operands. Routines used to implement an operator are referred to as operator routines.

The Contains operator accepts two parameters O1 and O2, O1 corresponds to 'e.resume', O2 to 'Oracle'. Both parameters are of the data type VARCHAR2, a string. O1 and O2 are each strings that identify data structures (e.g. columns, constants) that hold data for the first and second entities (O1 is the first parameter, O2 is the second parameter). Contains returns a TRUE/FALSE flag, referred to herein as a contains flag, that indicates whether a first entity contains the text of a second entity. In computing the value of the contains flag, the operator routine generates an intermediate result that specifies the number of instances of the second entity in the first entity. However, this intermediate result is not returned as a function value or parameter of Contains.

Scores takes the same parameters as Contains. However, it returns the number of instances of the second entity within the first. The number is herein referred to as a score value. The operator routine re-computes the score value, leading to multiple and duplicative re-computations of the same information.

When executing query A, a database server applies the operator Contains and Score to each row in table emp. The term "applies" refers to executing an operator routine using an item of data, such as a row or a column in a row, as input to the operator routine of an operator. For each row, the database server first executes the Contains operator routine, which ends up generating the score value for the row in addition to returning Contains flag. Likewise, when the database server executes the Score operator routine, it re-computes the score value for the entry.

Based on the foregoing, it is desirable to provide a method of accessing data computed by one function that may be used by another function, thus avoiding the overhead of re-computing the data.

SUMMARY OF THE INVENTION

The foregoing needs and objects, and other needs and objects that will become apparent from the following description, are achieved by the present invention, which comprises, in one aspect, a mechanism for accessing ancillary data, and for generating and accessing ancillary data more efficiently. According to an aspect of the present invention, ancillary data is generated during execution of the operator routine of a primary operator. The ancillary data is stored, and may be accessed through ancillary operators associated with the primary operator. Metadata is used to define a primary operator and ancillary operators associated with the primary operator. A DBMS, for example, receives a statement that includes a primary and at least one of its ancillary operators, and executes routines that implement the primary operator and the ancillary operator. During execution of the routine that implements the primary operator, ancillary data is generated. During the execution of the routine that implements the ancillary operator, the ancillary data is used.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for generating and accessing ancillary data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

A technique is described for sharing ancillary data between execution of invocations of operators, enabling ancillary data to be generated and used more efficiently. An invocation is a particular reference to an operator (or function). For example, Query A includes one operator invocation of the operator Contains, which is:

Contains(e.resume, 'Oracle')

According to an embodiment, ancillary data generated by a particular execution of an operator invocation is stored in a type of data structure referred to as a shared context. A shared context is a data structure used to store ancillary data shared between related functions. The DBMS passes the shared context as a parameter to an operator routine. Execution of the operator routine may generate ancillary data, which can be stored in the shared context. During subsequent execution of another related operator routine, the operator routine may access the ancillary data, thus using the ancillary data without generating it. For example, a score value generated during execution of the Contains operator routine may be stored in a shared context instance.

During execution of the ancillary operator "Score", the score value may be accessed in the shared context. The following query EX is provided as an example:

SELECT Score('1'), Score ('2')

FROM emp e

WHERE

Contains(e.resume, 'Oracle', 1) and

Contains(e.resume, 'Linux', 2)

Contains(e.resume, 'Oracle', '1') is an example of an invocation. The parameter value '1' in Contains(e.resume, 'Oracle', '1') is an invocation label. An invocation label associates invocations of operators.

During execution of a statement, the association determines which application of the invocations share ancillary data. For example, Score('1') is associated with Contains (e.resume, 'Oracle', '1'). When Score('1') and Contains (e.resume,'Oracle','1') are executed, ancillary data is shared during their execution.

Invocation Labels Define a Family of Related Functions

The operator invocations that are associated with the same invocation label, such as Score('1') and Contains(e.resume, 'Oracle', '1'), represent a family of related functions. Score ('1') and Contains(e.resume, 'Oracle', '1') operate on the records of a data set, and in particular, the rows of table emp. Second, the operator routine for Score may use ancillary data generated during the execution of the operator routine for Contains. In particular, Contains may generate the Score value and the Score routine simply accesses the score value generated for a row.

When the DBMS executes an invocation of the ancillary operator for a particular row, it passes in the shared context. The shared context may have been populated during previous execution of an related operator for the row. The operator may use and/or modify the previously populated data in the shared context.

The techniques described herein for generating and using ancillary data provide various advantages. Use of a shared context not only provides a mechanism for storing ancillary data for later access by an ancillary operator, it avoids costly recomputation of ancillary data. The data may be shared horizontally or vertically, i.e., between invocations of the related functions on the same row of the data set or between invocations of the operator between different rows of the data set.

Finally, a DBMS, or any entity that executes operators, does not need to know the specific structure of a shared context. The entity executing the operator simply passes in the shared context to an operator routine of the operator. DBMS users may thus develop their own operator routines and customized shared contexts.

Exemplary DBMS

Figure 1:
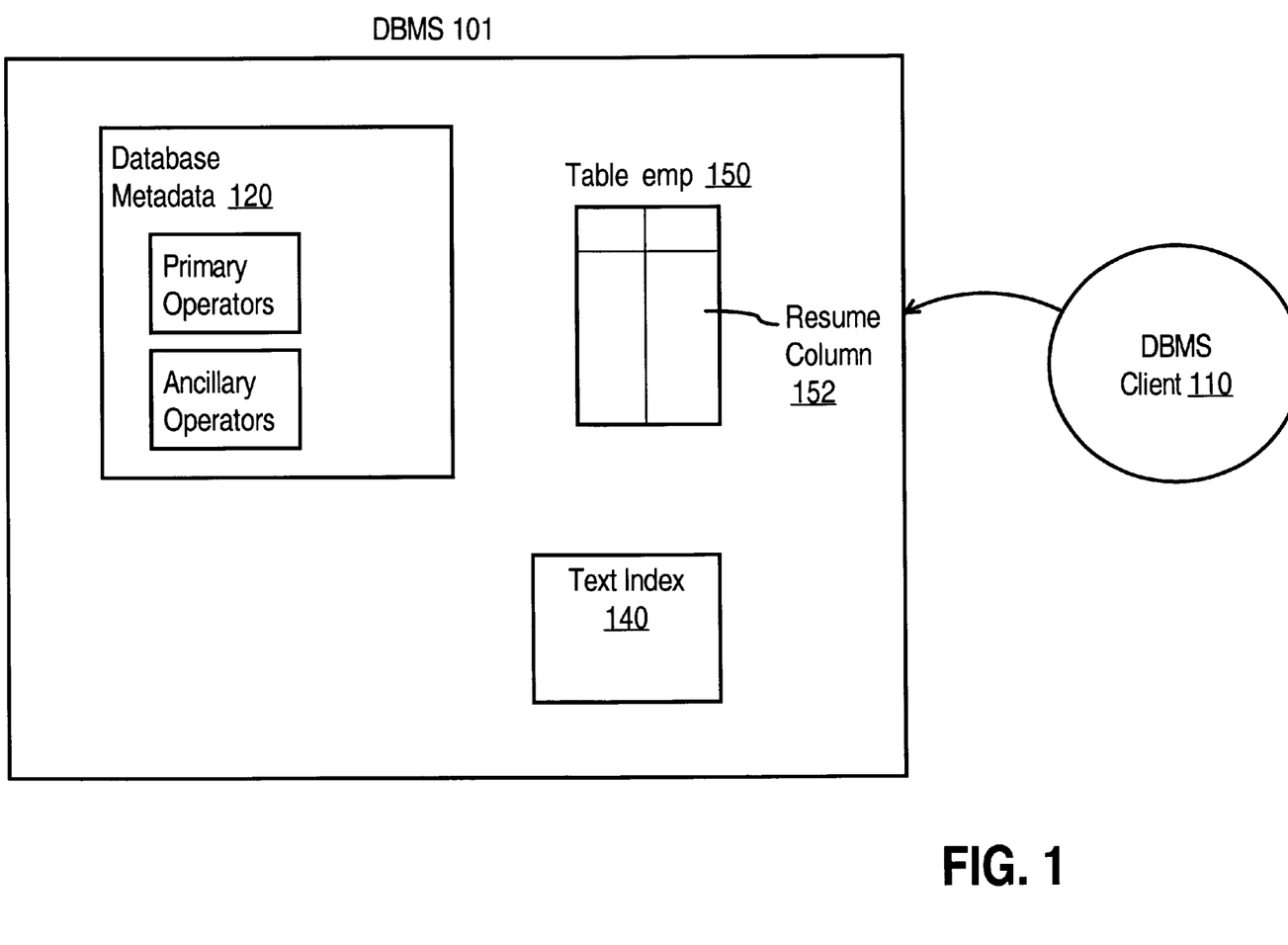
FIG. 1 is a block diagram depicting an exemplary database management system upon which an embodiment of the present invention may implemented.

FIG. 1 shows an exemplary data base management system (DBMS) 101 upon which an embodiment of the present invention may be implemented. A DBMS client 110 issues commands in the form of statements to DBMS 101. A statement is set of instructions which specify operations to be performed by a computer system or an entity executing therein, such as DBMS 101. Statements may specify, for example, queries, data manipulations, and arithmetic operations. Statements issued by DBMS client 110 to DBMS 101 may, for example, be SQL statements.

DBMS 101 includes database metadata 120, Text Index 130, and table emp 150. Database metadata 120 defines database objects managed by DBMS 101. Text Index 130 is a text index for a table emp (not shown) containing data describing employees. Database objects include tables, queries, views, data types, and functions, many of which are not shown.

Operator Metadata

In order to supply ancillary data to related functions that share the ancillary data, a mechanism is needed to indicate which operators share shared contexts, and how the shared contexts are shared. According to one embodiment, this functionality is provided using "operator metadata". Operator metadata is metadata that defines attributes of operators. These attributes include the operator's parameters, and their data types, and the data type of the return value of the operator. Operator metadata also defines operator routines. For each of the operator routines, the operator metadata may define parameters, the data types of the parameters, and the data type of the return value of the operator routine.

A primary operator is an operator whose operator metadata defines parameters for a family of related functions. Other functions in the family are referred to as ancillary operators. Their operator metadata does not explicitly define all their parameters. Rather, metadata for ancillary operators refers to a primary operator. In this manner, the parameters for the ancillary operators are defined by the primary operator metadata.

Figure 2:
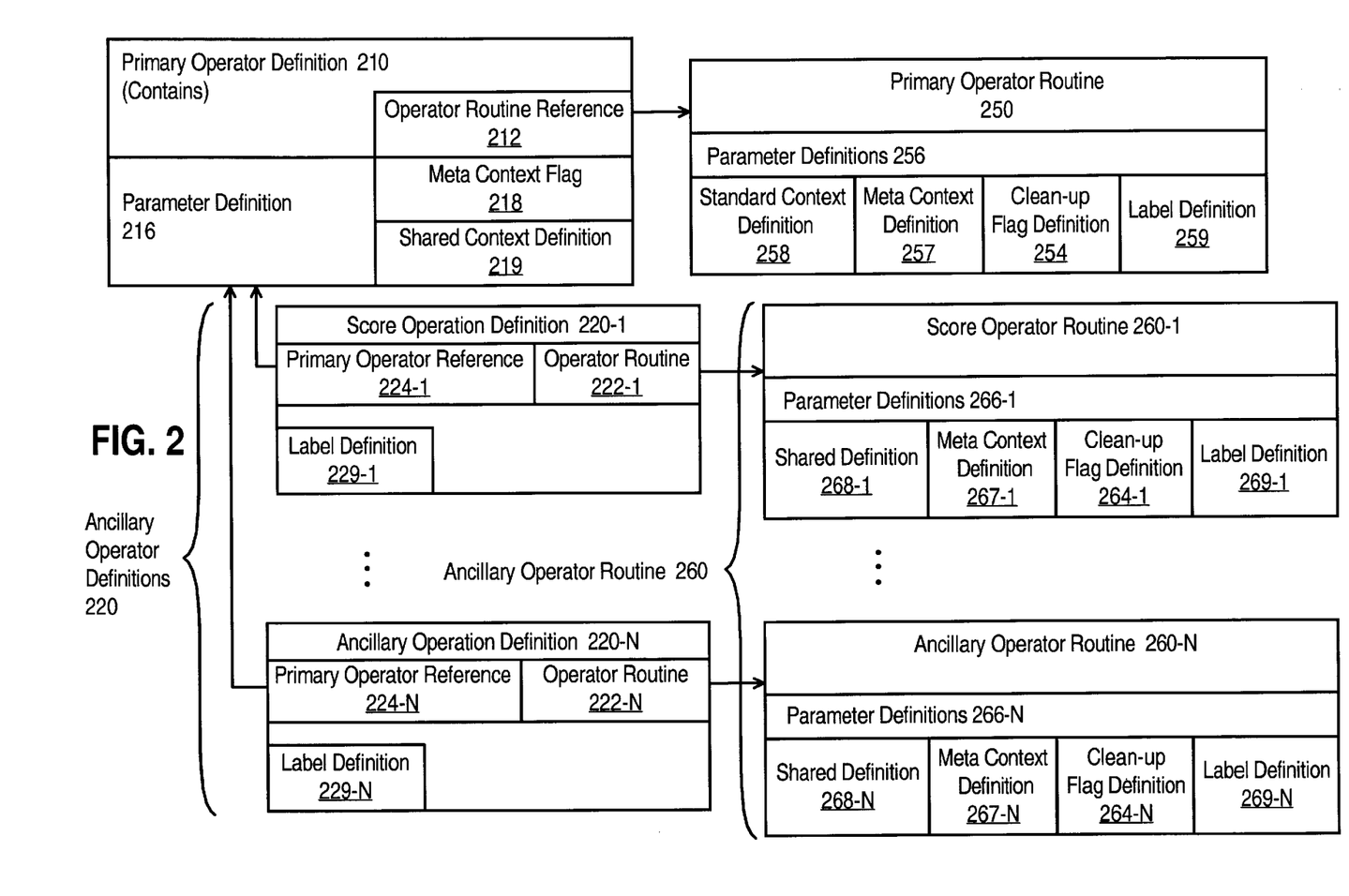
FIG. 2 is a block diagram depicting operator metadata.

FIG. 2 is a block diagram depicting operator attributes defined by operator metadata. After the entities in FIG. 2 are described, an illustrative set of declarations is described to illustrate what operator metadata may specify.

Referring to FIG. 2, primary operator definition 210 defines a primary operator Contains. Primary operator routine 250 is an operator routine for Contains. Ancillary operator definitions 220 define ancillary operators that operate upon ancillary data generated by primary operator Contains. Ancillary operator definitions 220 include ancillary operator definitions 220-1–220-N. Ancillary operator routines 260 are operator routines for operators defined by ancillary operator definitions 220.

Primary operator definition 210 includes operator routine reference 212, parameter definition 216, meta context flag 218, and shared context flag 219. An operator routine reference refers to an operator routine of the operator. Operator routine reference 212 refers to primary operator routine 250. Parameter definition 216 defines one or more parameters for Contains, and in particular, their data type. The shared context definition 219 defines a data structure for the shared context passed to the primary operator routine 250.

The Meta Context Flag 218 indicates whether or not a Meta Context is passed to the primary operator routine. A Meta Context is a data structure passed to a function in a family of related functions that contains metadata, such as information identifying the record to which the function is being applied, and other information about the environment within which the function is invoked, including applicable indexes.

Score Operator Definition 220-1 is an example of an Ancillary Operator Definition 220. Score Operator Definition 220-1 includes operator routine reference 222-1, invocation label definition 229-1, and primary operator reference 224-1. Operator routine reference 222-1 refers to score operator routine 260-1.

Primary operator routine 250 defines an operator routine of operator Contains. Primary operator routine 250 includes parameter definitions 256, which define parameters for the operator routine. Parameter definitions 256 include invocation label definition 259 and shared context definition 258, meta context definition 257, and cleanup flag definition 254.

A shared context definition 258 defines a parameter for the shared context passed to Primary operator routine 250, and meta context definition 257 defines a parameter for a meta context passed to Primary operator routine 250. DBMS 101 passes a shared context and meta context in a manner which shall be later described.

Clean-up flag 254 defines a clean-up flag to pass into an operator routine. The clean-up flag indicates to an operator routine that clean-up operations should be performed. Clean-up operations are operations performed after the function has been applied to all records in a data set. Clean-up operations include operations for relinquishing resources allocated for the process of applying the family of functions to the records of the data set, such as de-allocating memory used for the shared context and the meta context.

Score operator routine 260-1 defines an operator routine of operator Score. Score operator routine 260-1 includes parameter definitions 266-1, which define parameters for score operator routine 260-1. These parameter definitions include invocation label definition 269-1, meta-context definition 268-1, 267-1, and clean-up flag 264-1.

Shared context definition 268-1 specifies the same parameter data type as shared context definition 258. By defining identical data types for the shared context, the shared context instance generated for a primary operator routine may be passed to any of the corresponding ancillary operator routines.

Illustrative Operator Declarations

The following exemplary declarations illustrate what type of information operator metadata may describe. There are two types of declarations shown below: an operator declaration and an operator routine declaration. Because operator declarations refer to functions defined by operator routine declarations, the routine declarations should be submitted before their respective operator declarations. However, for purposes of illustration, operator declarations are presented herein before their respective operator routine declarations. The following declaration creates metadata defining operator Contains.

```
CREATE OPERATOR Contains
  BINDING (VARCHAR2, VARCHAR2) RETURN
    NUMBER
  WITH SYSTEM CONTEXT
  SCAN SHARED CONTEXT TextIndexMethods
  COMPUTE ANCILLARY DATA
  USING ContainsImp
```

The declaration specifies that the first two parameters for operator Contains have the data type VARCHAR2. The substring "COMPUTE ANCILLARY DATA" specifies that Contains is a primary operator. Thus, an invocation of Contains may specify an invocation label as a third parameter. The substring "WITH SYSTEM CONTEXT" specifies that a meta context is passed to the operator routine for Contains. The substring "SCAN SHARED CONTEXT TextIndexMethods" specifies that the data type of the shared context is TextIndexMethods. The substring "USING ContainsImp" specifies that the operator routine for Contains is ContainsImp.

The following operator routine declaration specifies ContainsImp as a function implementing operator Contains. The instructions for ContainsImp are not shown.

```
CREATE FUNCTION ContainsImp(text VARCHAR2,
    key VARCHAR2,
    sysctx IN ODCISysCtx,
    scanctx IN OUT TextIndexMethods,
    scanflg NUMBER)
```

The parameter declarations "text VARCHAR2" and "key VARCHAR2" define parameters that correspond to the first two parameters of operator Contains.

The parameter declaration "scanctx IN OUT TextIndexMethods" defines a parameter scanctx for passing the shared context. The parameter is of the data type TextIndexMethods, a data type supported by the database server. The parameter sysctx defines a meta context, and has the data type ODCISysCtx, which is supported by DBMS 101. The parameter scanflg defines Clean-up flag.

The following declaration defines operator Score.

```
CREATE OPERATOR SCORE
  BINDING (NUMBER) RETURN NUMBER
  ANCILLARY TO Contains(VARCHAR2,
    VARCHAR2)
  USING ScoreImp
```

The declaration specifies that operator Score takes one parameter of the type NUMBER. This parameter is used as an invocation label. The substring "ANCILLARY TO Contains(VARCHAR2, VARCHAR2)" specifies that Score is an ancillary operator for Contains, and, in particular, to the implementation of the Contains operator having the argument signature "(VARCHAR2, VARCHAR2)". An argument signature is the sequence of data types of the parameters of a function or routine. The substring USING ScoreImp specifies that the operator routine for Score is ScoreImp. The declaration for Score specifies that Score returns a value of the data type NUMBER.

The following declaration creates the ancillary operator routine ScoreImp.

```
CREATE FUNCTION ScoreImp(text VARCHAR2, key
    VARCHAR2,
    sysctx IN ODCISysCtx,
    scanctx IN OUT TextIndexMethods,
    scanflg NUMBER)
```

The declaration specifies the same argument signature as the primary operator routine Contains, in this example. Use of the same argument allows DBMS 101 to pass to an ancillary operator routine the parameters passed to the primary operator routine.

Illustrative Sharing of Shared Context

A technique for shared context sharing shall now be described in the context of executing a database query that references operators Contains and Score. Assume for the purposes of illustration that the following query SA is received by DBMS 101. When DBMS 101 receives the query, it performs query preprocessing to determine how the query should be executed, and to allocate resources for executing the query. Query preprocessing may include examining operator metadata to determine whether the query statement specifies any operators that share a shared context. If such operators are specified, DBMS 101 sets up the resources needed to support shared context sharing, and performs the operations needed to share a shared context.

For example, DBMS 101 receives the following Query SA:

SELECT Score ('1')

From Emp e

WHERE

Contains (e.resume,'Oracle')

Query SA specifies invocations of Contains and Score. DBMS 101 examines the metadata for these operators, and determines that Score is an ancillary operator for Contains. Query SA does not specify all parameter values for Score. Because Score is ancillary to operator Contains, when DBMS executes Score, it passes the parameter values specified by the invocation of Contains.

Figure 3:
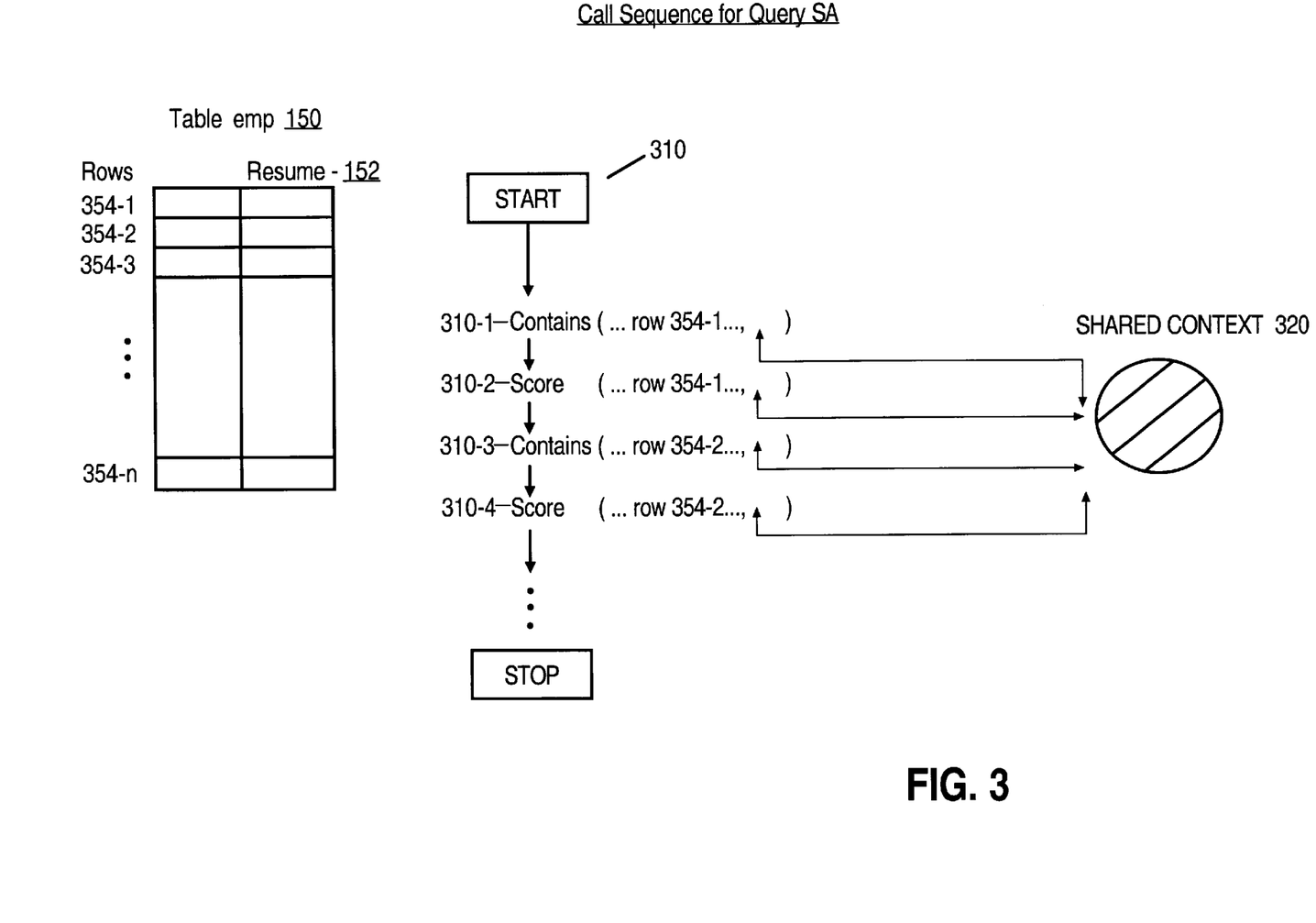
FIG. 3 is diagram depicting a call sequence for operators sharing a shared context.

To illustrate the sequence in which operators are applied to table Emp 150, FIG. 3 is provided. FIG. 3 is a diagram that shows the order in which operator routines for Contains and Score are called and applied to each row in Emp, and how a shared context 320 is shared by passing it when an operator routine is called. Call sequence 310 depicts calls 310-1, 310-2, and so forth. Each of calls 310 represents a call to an operator routine for either operator Contains or Score.

At call 310-1, DBMS 101 calls the operator routine Contains for row 310-1 in table emp 150. Shared context 320 is passed to the operator routine for Contains. Because row 310-1 is the first call, shared context 320 has a NULL value. In response to detecting that shared context 320 has a NULL value during execution of the operator routine for Contains, the shared context 320 is prepared so that it may be used for sharing ancillary data. Also, during the execution of the operator routine, a score value is generated and stored in the shared context 320. The score value is stored in association with information identifying the row 354-1. For example, the shared context may include, a mapping of score values to row identifiers that each identify a row from table emp 150. When the operator routine is applied to row 310-1 and a score value is generated, the operator routine stores data in the mapping to map the identifier of row 354-1 to the score value.

At next call 310-2, Score is called for row 354-1, passing in shared context 320. During this execution of the operator routine for Score, the score value previously generated and mapped to row 354-1 in shared context 320 may be used or modified. The mapping may be used to retrieve the score value. Thus, Score does not have to recompute the resultant score value and thus avoids redundant computation.

At next call 310-3, the operator routine for Contains is called for row 354-2, passing in shared context 320. Another score value is generated and mapped to row 354-2. The score value is stored in shared context 320. At next call 310-4, the operator routine for Score is called, passing in shared context 320. During this execution of the operator routine for Score, the score value previously generated and mapped to row 354-2 in shared context 320 may be used or modified.

Multiple Families of Related Functions in a Single Statement

Multiple families of related functions may exist within a single SQL statement. Each family may share a shared context. For example, the query SAF:

SELECT Score(1), and Score(2)

FROM emp e

WHERE

Contains(e.resume,'Oracle', 1) and

Contains(e.resume,'Linux', 2)

The invocations Score(1) and Contains(e.resume, 'Oracle', 1) are processed as a family of related functions. The operator routines of each are supplied with the same parameters, including the same shared context. Likewise, the invocations Score(2) and Contains(e.resume,'Linux', 2) are processed as a family of related functions. The operator routines of each are supplied with the same parameters, including the same shared context. However, a different shared context is used for each family.

Interleaved or Noninterleaved Execution Supported

Operators belonging to a family of related functions invocation may be executed in either an interleaved or a noninterleaved sequence. When executed in an interleaved sequence, all operators belonging to the family are applied against a record before any operator of the family is applied to another input record. Typically, the primary operator is applied against the record, then all of the ancillary operators are applied against the same record, and then the primary operator is applied to the next record.

For example, query SA involves the interleaved execution of operators. Thus, Contains(resume, 'Oracle', 1) and Score (1) are both executed on the first row of emp, then are executed on the second row of emp, then executed on the third row, and so on. Techniques described herein support both interleaved and noninterleaved executions. Once ancillary data is stored in a shared context during the execution of the primary operator, it is available in the shared context during any subsequent execution of a related function, whether the execution is interleaved or noninterleaved.

Invoking Ancillary Operators Before Primary Operators

To share a particular shared context instance between an execution of an ancillary operator and a primary operator, it is not necessary for the DMBS 101 to execute the primary operator invocation before executing the ancillary operator invocation. For example, consider query SPA. For query SPA, a query preprocessor may determine that it is more efficient to execute the Score operator in the WHERE clause before executing the Contains operator.

SELECT count(*)

FROM emp e

WHERE Contains (e resume, 'Oracle', 1) and Score (1)>50;

To generate a shared context instance for an execution of Score, DBMS 101 invokes the primary operator routine before commencing execution of the Score operator. The primary operator routine has the same argument signature as the ancillary operator routine, and thus DBMS 101 may simply supply parameters to the primary operator routine that DBMS 101 supplies to the ancillary operator. The process of supplying a shared context instance to the execution of an ancillary operator that occurs before the execution of the corresponding primary operator is referred to as ancillary pre-execution.

Other Alternate Embodiments

Use of identical argument signatures for a primary operator routine and an ancillary operator routine is not necessary.

It should be understood that the present invention is not limited to ancillary operator routines and primary operator routines that share the same argument signature. For example, use of identical argument signatures is not necessary for ensuring that the shared context may be passed to both the ancillary and primary operator routine. As explained earlier, use of the same argument signature for a primary operator routine and the corresponding ancillary operator routines not only ensures that an ancillary operator routine accepts a parameter for the shared context, but also ensures that the same parameter position and data type are used to pass a shared context instance. Rather than using the same argument signature, operator metadata may be used to map parameters in a primary operator routine to corresponding parameters in the ancillary operator routine.

It is not necessary to identify in a family of related functions one operator as primary and the others as ancillary. Operator metadata may define the parameters of each family of related functions. In a statement, any invocation of a function from the family may specify the parameter values. For example, the following query SAF' would be the equivalent of query SAF.

SELECT Score(e.resume, 1), and Score(2)
FROM emp e
WHERE
  Contains(1) and
  Contains(e.resume,'Linux', 2)

Use of a DBMS is not required. An embodiment of the invention may be implemented on any mechanism that executes statements that contain operators applied to a set of records.

Domain Indexes

Domain indexes provide a general framework for integrating non-native indexes into a database system. The user supplies meta-data defining an index type. The metadata defines, among other items, one or more routines for not only creating and maintaining data, but also for retrieving data using an index.

A technique for implementing a domain index is described in the U.S. Pat. No. 5,893,104, entitled Extensible Indexing, issued on Apr. 6, 1999 to Jagannathan Srinivasan, Ravi Murthy, Chin Hong, Samuel DeFazio, and Anil Nori. The technique involves receiving a query written in a database language, and scanning a domain index using a user supplied access routine that returns rows. Such routines are herein referred to as user-supplied fetch routines. The user-supplied fetch routines may be used to generate ancillary data for a family of functions that reference a query.

For example, a user-supplied fetch routine is defined for a domain text index for the column resume in table emp. When DBMS 101 receives a query in the form of query SA, it invokes the user-supplied fetch routine, and passes in as parameters, among others, the predicate of query SA and a shared context. The user supplied routine examines the predicate of query SA, scans index entries based on restrictions specified in the predicate to determine what rows satisfy the predicate. The entries of the text index contain information that is used to calculate a score values for each of the rows that satisfy the predicate. The score values are stored in the shared context mapped to the appropriate rows. The Score routine that is later invoked with the same shared context can access the ancillary data.

Hardware Overview

Figure 4:
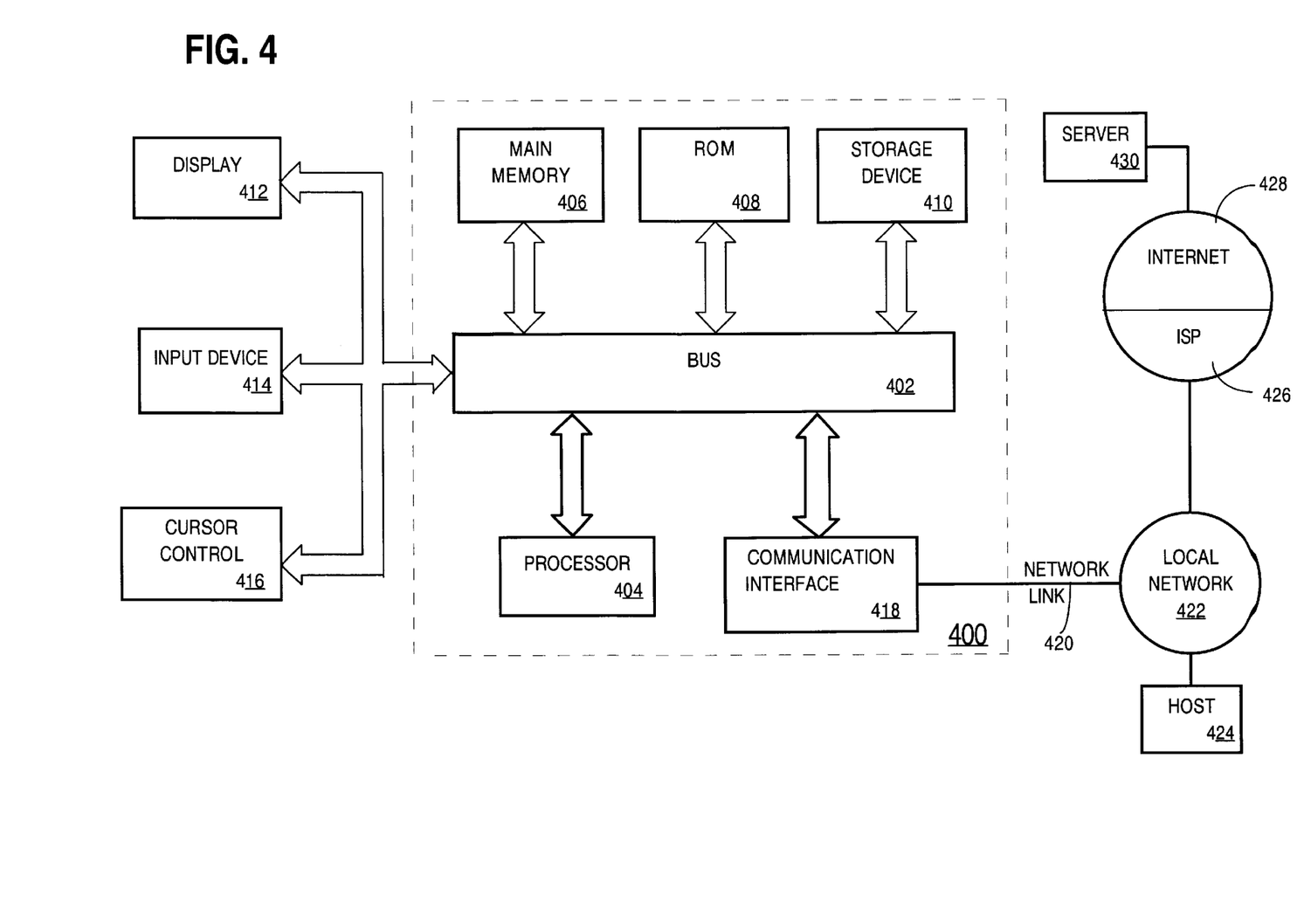
FIG. 4 is a block diagram depicting an exemplary computer system upon which an embodiment of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for modeling ancillary data. According to one embodiment of the invention, modeling ancillary data is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such operator routine, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for modeling ancillary data as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of supplying data for operators referenced by a statement, the method comprising the steps of:

updating metadata to indicate that a second operator routine that implements a second operator uses data from a first operator routine that implements a first operator;

after updating said metadata, receiving said statement that includes said first operator and said second operator;

after receiving said statement, inspecting said metadata to determine that said second operator routine uses data generated by said first operator routine; and executing said statement, wherein the step of executing said statement includes:
causing execution of said first operator routine,
generating said data by executing said first operator routine,
causing execution of said second operator routine, and
in response to determining that said second operator routine uses data generated by said first operator routine, causing said second operator routine to use said data.

2. The method of claim 1, wherein the execution of said first operator routine includes:

applying said first operator routine to a record from a data set; and storing information that establishes an association between said data set and said record.

3. The method of claim 2, wherein the step of applying said first operator routine to a record includes applying said first operator routine to a record that is a row in a table in a database system.

4. The method of claim 2, wherein the method further includes the step of before the execution of said second operator routine, determining that an association between said data set and said record has not been established; and wherein the step of causing the execution of said first operator routine is performed in response to determining that an association between said data set and said record has not been established.

5. The method of claim 1, wherein:

the step of receiving said statement includes the step of receiving a statement that includes a third operator implemented by a third operator routine;

the method further includes the step of inspecting said metadata after receiving said statement to determine that said third operator routine uses data generated by said first operator routine; and wherein the step of executing said statement includes:
causing execution of said third operator routine, and
causing said third operator routine to use said data.

6. The method of claim 1, wherein the step of receiving said statement includes receiving a statement that includes a first invocation that corresponds to said first operator and a second invocation that corresponds to said second operator wherein said second invocation specifies that execution of an operator routine that corresponds to said first operator generates data used during execution of an operator routine that corresponds to said second invocation.

7. The method of claim 6, wherein the step of receiving said statement includes receiving a statement that includes said first invocation and said second invocation, wherein said first invocation includes a first parameter and said second invocation includes a second parameter that corresponds to said first parameter, wherein said second invocation specifies a parameter value that matches a parameter value specified for said first parameter.

8. The method of claim 1, wherein the step of updating metadata includes the step of updating metadata to indicate that a second operator routine with a second argument signature uses data from a first operator routine with a first argument signature that is identical to the second argument signature.

9. The method of claim 1, wherein the step of updating metadata includes the step of updating metadata to indicate that a second operator routine with a second argument signature uses data from a first operator routine with a first argument signature that differs from the second argument signature.

10. The method of claim 1, wherein the step of receiving said statement includes receiving a statement that includes a first invocation that corresponds to said first operator and a second invocation that corresponds to said second operator, wherein said first invocation has an argument signature that differs from the argument signature for said second invocation.

11. The method of claim 2, wherein the execution of said first operator routine and the execution of said second operator routine is not interleaved.

12. The method of claim 1, wherein said first operator routine is configured to scan a domain index for entries that correspond to rows that satisfy at least one criterion specified in an SQL statement predicate.

13. The method of claim 1, wherein the step of updating metadata includes the step of updating metadata to indicate that said second operator is a primary operator and said first operator is an ancillary operator.

14. The method of claim 13, wherein the step of executing said statement includes applying said first operator to a record before applying said second operator to the record.

15. A method of supplying data for operators referenced by a statement, the method comprising the steps of:
  receiving said statement that includes a first invocation that corresponds to a first operator, a second invocation that corresponds to a second operator, and a third invocation that corresponds to said first operator;
  wherein said first invocation includes a first parameter and said second invocation includes a second parameter that corresponds to said first parameter, wherein said second invocation specifies a second parameter value that matches a first parameter value specified by said first invocation for said first parameter;
  determining that said first parameter value matches said second parameter value;
  after determining that said first parameter value matches said second parameter value, executing said statement, wherein the step of executing said statement includes:
    causing execution of a first operator routine that implements said first operator,
    generating said data during the execution of said first operator routine,
    causing execution of a second operator routine that implements said second operator, and
    in response to determining that said first parameter value matches said second parameter value, using said data during the execution of said second operator routine; and
  wherein said first invocation and said second invocation do not reference said data as one or more parameters.

16. The method of claim 15, further including the steps of
  before receiving said statement, updating metadata to indicate that said second operator routine uses data from the first operator routine;
  after receiving said statement, inspecting said metadata to determine that said second operator routine requires data generated by said first operator routine; and
  wherein said step of determining that said first parameter value matches said second parameter value is performed in response to determining that said second operator routine requires data generated by said first operator routine.

17. A computer-readable medium carrying one or more sequences of one or more instructions for supplying data for operators referenced by a statement, the one or more sequences of one or more instructions including instructions which, when executed by one or more processors, cause the one or more processors to perform the steps of:
  updating metadata to indicate that a second operator routine that implements a second operator uses data from a first operator routine that implements a first operator;
  after updating said metadata, receiving said statement that includes said first operator and said second operator;
  after receiving said statement, inspecting said metadata to determine that said second operator routine uses data generated by said first operator routine; and
  executing said statement, wherein the step of executing said statement includes:
    causing execution of said first operator routine,
    generating said data by executing said first operator routine,
    causing execution of said second operator routine, and
    in response to determining that said second operator routine uses data generated by said first operator routine, causing said second operator routine to use said data.

18. The computer-readable medium of claim 17, wherein the execution of said first operator routine includes:
  applying said first operator routine to a record from a data set; and
  storing information that establishes an association between said data set and said record.

19. The computer-readable medium of claim 18, wherein the step of applying said first operator routine to a record includes applying said first operator routine to a record that is a row in a table in a database system.

20. The computer-readable medium of claim 18, wherein the method further includes the step of
  before the execution of said second operator routine, determining that an association between said data set and said record has not been established; and
  wherein the step of causing the execution of said first operator routine is performed in response to determining that an association between said data set and said record has not been established.

21. The computer-readable medium of claim 17, wherein:
  the step of receiving said statement includes the step of receiving a statement that includes a third operator implemented by a third operator routine;
  the method further includes the step of inspecting said metadata after receiving said statement to determine that said third operator routine uses data generated by said first operator routine; and wherein the step of executing said statement includes:
   causing execution of said third operator routine, and
   causing said third operator routine to use said data.

22. A computer-readable medium carrying one or more sequences of one or more instructions for supplying data for operators referenced by a statement, the one or more sequences of one or more instructions including instructions which, when executed by one or more processors, cause the one or more processors to perform the steps of:

receiving said statement that includes a first invocation that corresponds to a first operator, a second invocation that corresponds to a second operator, and a third invocation that corresponds to said first operator;

wherein said first invocation includes a first parameter and said second invocation includes a second parameter that corresponds to said first parameter, wherein said second invocation specifies a second parameter value that matches a first parameter value specified by said first invocation for said first parameter;

determining that said first parameter value matches said second parameter value;

after determining that said first parameter value matches said second parameter value, executing said statement, wherein the step of executing said statement includes:
      causing execution of a first operator routine that implements said first operator,
      generating said data during the execution of said first operator routine,
      causing execution of a second operator routine that implements said second operator, and
      in response to determining that said first parameter value matches said second parameter value, using said data during the execution of said second operator routine; and wherein said first invocation and said second invocation do not reference said data as one or more parameters.

* * * * *